US007347602B2

(12) United States Patent
Fleury et al.

(10) Patent No.: US 7,347,602 B2
(45) Date of Patent: Mar. 25, 2008

(54) HEADLIGHT FOR A MOTOR VEHICLE WITH A CUT-OFF BEAM, AND A SHIELD ASSEMBLY FOR SUCH A HEADLIGHT

(75) Inventors: Benoist Fleury, Bobigny Cedex (FR); Nicolas Louvet, Bobigny Cedex (FR); Jean-Matthieu Tourenq, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 121 days.

(21) Appl. No.: 11/100,964

(22) Filed: Apr. 7, 2005

(65) Prior Publication Data

US 2005/0225996 A1 Oct. 13, 2005

(30) Foreign Application Priority Data

Apr. 9, 2004 (FR) .................................. 04 03797

(51) Int. Cl.
*B60Q 1/06* (2006.01)
*F21V 11/18* (2006.01)

(52) U.S. Cl. ...................... 362/539; 362/539; 362/512; 362/510

(58) Field of Classification Search ................ 362/539, 362/512, 513, 538
See application file for complete search history.

(56) References Cited

U.S. PATENT DOCUMENTS

| | | | | |
|---|---|---|---|---|
| 4,100,594 A | 7/1978 | Gould | ........................ | 362/308 |
| 4,686,610 A | 8/1987 | Cibie et al. | .................... | 362/61 |
| 6,874,923 B2 * | 4/2005 | Albou et al. | ................ | 362/512 |
| 6,997,590 B2 * | 2/2006 | Garcia et al. | ............... | 362/539 |
| 7,008,094 B2 * | 3/2006 | Taniuchi | ..................... | 362/539 |
| 2001/0021113 A1 | 9/2001 | Eichler | ....................... | 362/539 |
| 2002/0003709 A1 | 1/2002 | Albou | ........................ | 362/539 |

FOREIGN PATENT DOCUMENTS

| | | |
|---|---|---|
| EP | 0108915 A1 | 5/1984 |
| EP | 0293959 A | 7/1988 |
| EP | 0937942 A2 | 8/1999 |
| FR | 45488 | 11/1934 |
| FR | 2566878 | 6/1984 |
| FR | 2754039 | 4/1998 |
| FR | 2811408 | 11/2002 |
| GB | 2179132 A | 2/1987 |

* cited by examiner

*Primary Examiner*—Anabel Ton
(74) *Attorney, Agent, or Firm*—Morgan & Finnegan L.L.P.

(57) ABSTRACT

The object of the invention is a headlight for a motor vehicle comprising a reflector of the ellipsoidal type; a light source placed at a first focus of the reflector; a convergent optical means whose object focus is situated close to the second focus of the reflector; a first shield situated close to the second focus of the reflector and oriented transversely to the optical axis of the headlight with a substantially horizontal top edge; and a second shield substantially parallel to the first shield but offset along the optical axis in order to be situated closer to the optical means. The second shield is fixed to the first in order to form a single-piece assembly with a transverse section substantially in a V or U shape, the two arms of which correspond to the two shields.

21 Claims, 1 Drawing Sheet

HEADLIGHT FOR A MOTOR VEHICLE WITH A CUT-OFF BEAM, AND A SHIELD ASSEMBLY FOR SUCH A HEADLIGHT

FIELD OF THE INVENTION

The invention relates to a headlight for a motor vehicle intended to produce a light beam with a cut-off in the top region of the beam, this headlight comprising:

- a reflector of the ellipsoidal type,
- a light source placed substantially at a first focus of the reflector,
- a convergent optical means whose object focus is situated close to the second focus of the reflector,
- a first shield situated between the second focus of the reflector and oriented transversely to the optical axis of the headlight with a substantially horizontal top edge,
- and a second shield substantially parallel to the first shield but offset along the optical axis in order to be situated between the second focus and the optical means, the shields creating a cut-off in the beam whilst limiting iridescence phenomena.

It should be noted that, within the meaning of the invention, the term “parallel” is preferably to be interpreted in a broad sense, as substantially equidistant along a given horizontal section: this is because the two shields may be planar and effectively parallel to each other but may also have walls inclined relative to each other (V shaped) in vertical section, and therefore not parallel in the strict sense of the word. They may also, in horizontal section this time, be at least partially curved, the curvatures being identical or close. What counts is that the shields, in horizontal section, are separated at every point by a substantially constant distance.

The invention concerns more particularly a headlight for providing a dipped function.

In a headlight as defined previously, the reflector is an achromatic system, that is to say the light rays have the same travel independently of their wavelengths, corresponding to their colours. On the other hand the optical means, in particular formed by a thick convex planar lens, is a highly chromatic system in which the travel of the light rays depends on the wavelength.

At infinity, or at a great distance in comparison with the dimensions of the headlight, the image of the physical limit of a single shield will be iridescent in a colour depending on the focal distance setting of the optical means, this setting consisting of adjusting of the position of the object focus of the optical means on the optical axis.

A coloured automobile lighting beam is not acceptable either from the point of view of safety in order to avoid a nuisance to drivers coming in the opposite direction, or from the regulatory point of view.

BACKGROUND OF THE INVENTION

U.S. Pat. No. 4,100,594 describes a headlight of the type defined above in which two shields separated from each other in the direction of the optical axis are provided for reducing or eliminating the phenomenon of iridescence of the light beam. However, the presence of two shields complicates assembly and increases the bulk inside the headlight not only because of the two shields but also the means for holding them relative to the headlight and with respect to each other.

The aim of the invention is in particular to provide a headlight as defined above which, whilst reducing or eliminating the phenomenon of iridescence, is more simple to assemble and has good compactness of the internal parts.

SUMMARY OF THE INVENTION

According to the invention, a headlight for a motor vehicle, of the type in question, is defined so that the second shield is fixed to the first in order to form a single-piece assembly with a substantially V or U shaped transverse section whose two arms correspond to the two shields.

The means of holding the shields are thus reduced to those provided for a single shield. Assembly is simplified and the bulk reduced.

Alternatively or additionally to those features, the second shield comprises an opaque transverse strip and an area transparent to light rays situated below this strip.

The two shields can be produced in a single metallic piece cropped, pressed and curved so as to have a substantially V or U shaped transverse section, or in a single piece made from polymer material.

The presence of two shields gives rise to a reduction in the concentration of the light rays in the region of the beam close to the cut-off.

According to another provision of the invention, preferably used with the above provisions, the second shield comprises an opaque transverse strip determining its top edge and, below this opaque strip, an area transparent to light rays which extends on each side of the optical axis in order to allow rays which participate in the formation of the headlight beam, in particular in the range area, to pass.

This arrangement ensures a stronger light concentration in the region of the beam close to the cut-off and improves the photometric performance of the headlight. Such an arrangement is still advantageous even if the second shield is not fixed to the first.

The height of the strip on the second shield is no more than 4 mm, preferably no more than 3.5 mm, and for example 1.5 mm. The height of the transparent area is at least 1 mm, preferably at least 1.5 mm, for example 2 mm.

The second shield (the farthest from the light source) can be produced from an opaque material, in particular metal; the area transparent to rays then consists of an opening produced in the second shield below its cut-off edge.

The limit of the transparent area close to the edge of the shield is parallel to this edge. The opening can be cut in the part constituting the second shield.

In a variant, the second shield can also be produced from a polymer material, in particular a transparent material provided, on at least one face, with an opaque covering, except for the said transparent area.

The transverse extent of the transparent area is sufficient to ensure the participation of rays in the formation of the beam substantially throughout its useful angular extent, in particular at least over +50 on each side of the optical axis. The extent of the transparent area can be asymmetric with respect to the optical axis and stronger on one side than the other.

The optical means can be formed by a simple thick convex planar lens which allows a “red” focus for wavelengths corresponding to the colour red and a “blue” focus for wavelengths corresponding to the colour blue. Advantageously, the first shield is situated close to the red focus whilst the second shield is situated close to the blue focus.

For a beam with a cut-off of the “European dipped beam” type, the top edge of each shield comprises two horizontal segments offset in height, connected by an inclined segment.

The headlight can be of the multi-function type, in particular dual dipped/main beam function, and the shields are then mounted so as to be retractable in order to be retracted in the main-beam function.

The light source may be a xenon lamp.

The invention also relates to a shield assembly for a headlight, so that it comprises two substantially parallel shields fixed together, offset with respect to each other in a direction orthogonal to their large dimension. The two shields can be formed from a single metallic piece cropped, pressed and bent substantially in a V or U shape, the two arms of the V or U corresponding to the two shields.

One of the shields is entirely opaque and the other shield (notably the farthest from the light source) can comprise an opaque transverse strip and an area transparent to light rays situated below this strip.

The invention consists, apart from the provisions disclosed above, of a certain number of other provisions which will be dealt with more explicitly below with regard to an example embodiment described in detail with reference to the accompanying drawing, but with is in no way limiting.

In this drawing:

DESCRIPTION OF THE PREFERRED EMBODIMENTS

Figure 1:
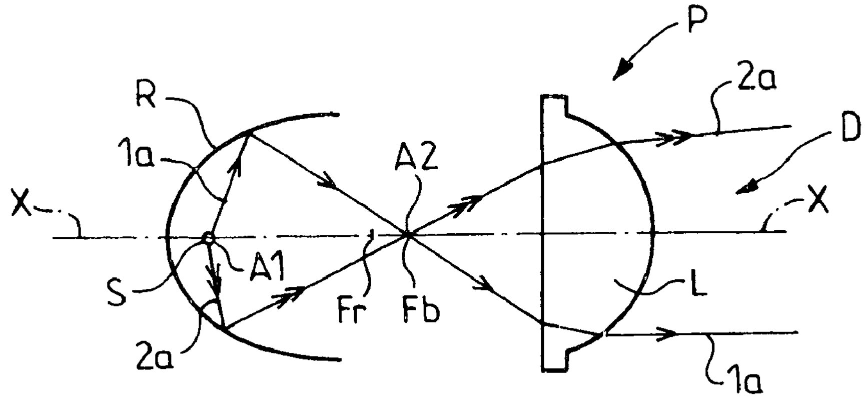
FIG. 1 and FIG. 2 are diagrams explaining the phenomenon of iridescence.

Referring to FIG. 1, the diagram of a headlight P for a motor vehicle of the elliptical module type can be seen. The headlight comprises a reflector R of the ellipsoidal type, a light source S placed at the first focus A1 of the reflector and a convergent optical means D whose object focus is situated close to the second focus A1 of the reflector R.

The reflector R is an achromatic system in which the light rays have the same travel independently of their wavelengths.

On the other hand, the optical means D formed by a thick convex planar lens L is highly chromatic, that is to say the travel of the light rays depends on their wavelengths. The position of the object focus of the lens L along the optical axis X-X common to the reflector and lens will depend on the wavelength in question. To simplify, considering the blue and red wavelengths of visible light, it is possible to define, for the lens L, a blue focus Fb and a red focus Fr. In a variant, the optical means D can be formed by a set of lenses.

FIG. 1 illustrates a focal distance setting of the lens L such that the blue focus Fb is merged with the second focus A2 of the reflector R. The blue rays 1*a* issuing from the source S and passing through the focus Fb after reflection on R are collimated and emerge from the lens L parallel to the optical axis X-X. On the other hand the red rays such as 2*a*, reflected and passing through the focus Fb, emerge from the lens L in the form of divergent rays since the red focus Fr is further away from the lens than Fb.

Figure 2:
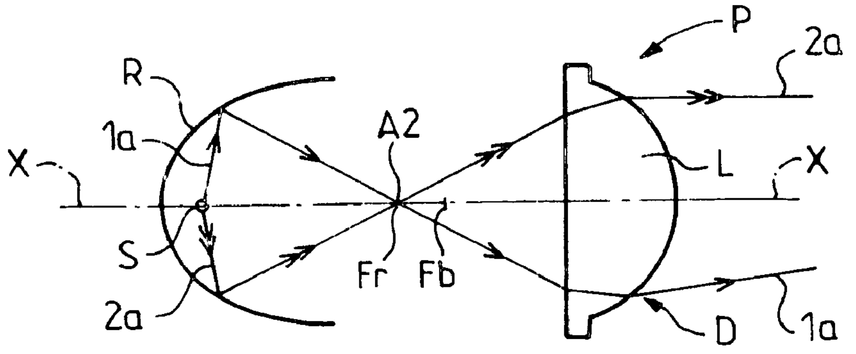

FIG. 2 illustrates the configuration when the focal distance setting of the lens L places the red focus Fr so as to coincide with the second focus A2 of the reflector R. The red rays 2*a* which pass through the focus Fr after reflection are collimated and emerge from the lens L parallel to the optical axis X-X. On the other hand, the blue rays 1*a* at the exit from the lens L are convergent.

At infinity, or at a great distance compared with the dimensions of the headlight D, the image of the physical limit of a shield situated in the plane orthogonal to the optical axis X-X and passing through the focus A2, or close by, will be iridescent in a colour depending on the focal distance setting of the lens L. In the case of the adjustment in FIG. 1 the cut-off will appear red, whilst in the case of the adjustment in FIG. 2 the cut-off will appear blue.

According to the invention, the chromatic sensitivity of the headlight is reduced by the use of a first shield C1 (FIG. 3) oriented transversely to the optical axis X-X of the headlight with its top edge substantially horizontal, and a second shield C2 whose top edge is substantially parallel to that of the first shield C1 but is offset along the optical axis in order to be situated closer to the lens L. The top edges of the shields C1, C2 are situated close to the optical axis, preferably slightly below. The first shield C1 is situated in a plane close to the red focus plane Fr of the lens L whilst the second shield C2 is situated in a plane close to the blue focus plane Fb of the lens.

The two shields C1, C2 are advantageously formed from a single metallic piece (FIG. 4) cropped, pressed and bent substantially in the shape of a V or U turning its concavity upwards. U-shaped designates a configuration comprising two arms which are substantially parallel, at least over part of their length. The two arms of the V or U shaped section correspond to the two shields C1, C2 whilst the base of the V or U, which provides the mechanical connection between the two shields, determines the bottom edge of each shield.

The second shield C2 preferably comprises an opaque transverse strip 3 determining the top edge 4 and, below this strip, an area 5 transparent to light rays which extends on each side of the optical axis.

Figure 4:
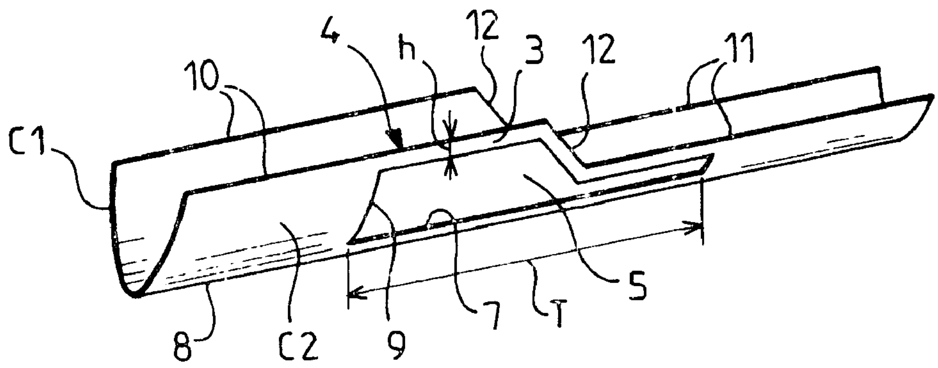
FIG. 4 is a perspective view to a larger scale of the two shields of the headlight of FIG. 3.

The cut-outs of the shields C1 and C2 are substantially the same, as can be seen in FIG. 4, and give superimposed images which make it possible to obtain a neutral cut-off of the light beam, with no iridescence.

For the second shield C2, only the top part or transverse strip 3, corresponding to the cut-off, participates in the illumination of the risks of iridescence of the beam, so that the presence of the transparent area 5 does not modify the achromatic characteristic of the whole.

On the other hand, the transparent area 5 enables rays such as 6 (FIG. 3) which, after reflection on R, pass through the area 5, to participate in the formation of the beam E and in particular the range areas, that is to say the areas situated in front of the headlight close to the optical axis on each side.

The result is a substantial improvement in the photometric performance of the headlight P, and the obtaining of points of stronger concentration in the vicinity of the cut-off. This improvement due to the area 5 is preserved even if, in a variant, the shields C1, C2 form two distinct separate pieces.

The height h of the strip 5 on the second shield C2 is no more than 4 mm, preferably no more than 3.5 mm, and for example 1.5 mm.

The height of the transparent area 5 is at least 1 mm, preferably at least 1.5 mm, for example 2 mm. The bottom edge 7 of the transparent area is situated close to the bottom edge 8 of the shield C2.

The second shield C2 can be produced from an opaque material, in particular metal. The transparent area 5 is then formed by an opening 9 or window cut in the second shield below the strip 3.

In order to determine a cut-off of the "European dipped beam" type, the top edge of each shield C1, C2 comprises two horizontal segments 10, 11 offset in height connected by an inclined segment 12. The strip 3 is parallel to the segments 10, 11 and 12.

The transverse extent T (FIG. 4) of the opening 5 is designed to ensure the participation of light rays in the formation of the beam over the entire useful angular extent of the beam, in particular over an angular extent of ±5° transversely on each side of the optical axis X-X. The extent of the opening 5 may be asymmetric with respect to the optical axis and stronger on one side than on the other.

Figure 3:
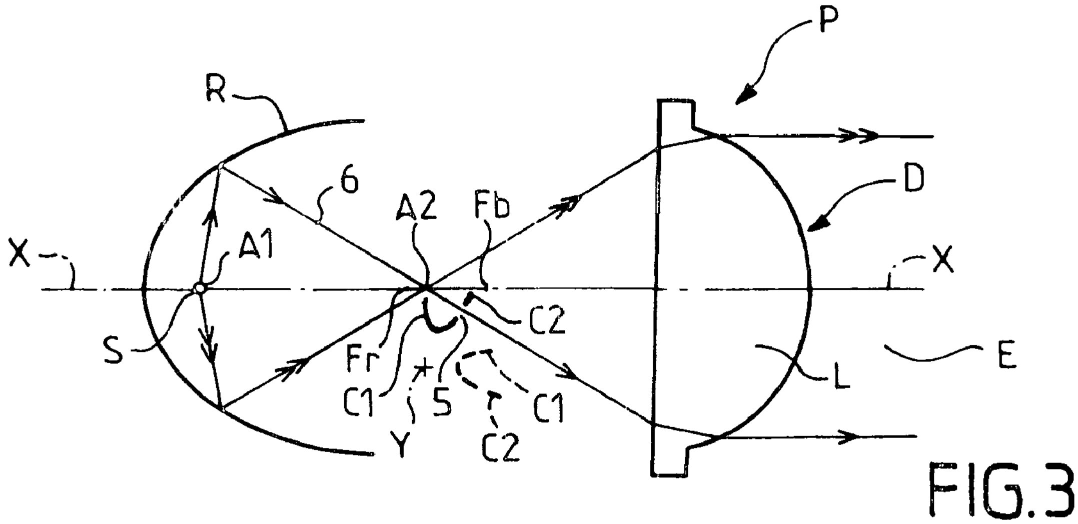
FIG. 3 is a diagram of a headlight according to the invention, the shield assembly being shown in a solid line in the working position and in a broken line in the retracted position.

The two shields C1 and C2, fixed to each other and forming an assembly in a single piece, can be supported by a single mechanism (not shown) enabling them to be retracted, for example by tilting downwards, in the clockwise direction according to FIG. 3, about a transverse axis of rotation Y perpendicular to the axis X-X and situated below the shields. The headlight can then be multi-functional, in particular dual function, namely "dipped" when the shields are in the working position illustrated in a solid line in FIG. 3, or "main beam" when the shields are in the tilted position shown in a broken line. In a variant, the headlight could also provide more than two functions, for example three functions: dipped beam traffic on the right; dipped beam traffic on the left; and main beam.

The light source S is advantageously a xenon lamp.

In the example shown in FIG. 4 the top edges of the shields C1 and C2 are situated in a plane orthogonal to the optical axis X-X.

In the case of a single-function headlight (for example dipped solely) the top edge of the shields C1 and C2 could take account of the curvature of the optical field and consist of a curved line turning its concavity towards the lens L.

A headlight according to the invention makes it possible to obtain photometric concentration points close to the cut-off, whilst preventing a phenomenon of iridescence of the beam. The focal distance setting of the lens L becomes practically unnecessary, whilst it is very critical when a single shield is present. The invention intends to protect also the shields independently from the king of headlamp/optical module in which they are to be inserted.

What is claimed is:

1. Headlight for a motor vehicle having an optical axis, intended to produce a light beam with a cut-off in the top region of the beam, comprising:

(a) a reflector, notably of the ellipsoidal type, having a first focus and a second focus disposed on the optical axis;

(b) a light source placed substantially at the first focus of the reflector, (c) a convergent optical means having an object focus situated close to the second focus of the reflector;

(d) a first shield having a substantially horizontal top edge situated in the vicinity of the second focus of the reflector, the top edge of the first shield being disposed adjacent to and extending substantially transversely to the optical axis of the headlight; and (e) a second shield having a substantially horizontal top edge substantially parallel to the top edge of the first shield but offset along the optical axis in order to be situated closer to the optical means, the top edge of the second shield being disposed adjacent to and extending substantially transversely to the optical axis of the headlight;

wherein the first and second shields create a cut-off in the light beam of the headlight, notably limiting iridescence phenomena, and the second shield and the first shield comprise a single piece with a transverse section substantially in a V or U shape, the two arms of which correspond to the two shields.

2. Headlight according to claim 1, wherein the first and second shields comprise a single metallic piece cropped, pressed and curved so as to have a substantially V or U shaped transverse section.

3. Headlight according to claim 1, wherein the first and second shields comprise a single piece from polymer material.

4. Headlight according to claim 1, wherein the second shield comprises an opaque transverse strip disposed at its top edge and, below this opaque strip, an area transparent to light rays which extends transversely on each side of the optical axis in order to allow rays which participate in the formation of the beam of the headlight to pass, in particular in the range areas.

5. Headlight according to claim 4, wherein the height of the strip on the second shield is no more than 3.5 mm.

6. Headlight according to claim 4, wherein the height of the transparent area is at least 1.5 mm.

7. Headlight according to claim 4, wherein the height of the strip on the second shield is no more than 4 mm.

8. Headlight according to claim 4, wherein the height of the transparent area is at least 1 mm.

9. Headlight according to claim 4, wherein the second shield comprises an opaque material, the area transparent to rays being formed by an opening produced in the second shield below the strip.

10. Headlight according to claim 4, wherein the limit of the transparent area close to the edge of the shield is parallel to this edge.

11. Headlight according to claim 3, wherein the second shield comprises a transparent material provided, on at least one face, with an opaque covering except for the transparent area.

12. Headlight according to claim 4, wherein the transverse extent of the transparent area is sufficient to ensure the participation of rays in the formation of the beam in at least part of the useful angular extent, in particular substantially throughout its useful angular extent, especially over at least ±5° on each transverse side of the optical axis.

13. Headlight according to claim 1, in which the optical means comprises a simple thick convex planar lens which allows a red focus for wavelengths corresponding to the color red and a blue focus for wavelengths corresponding to the color blue, wherein the first shield is situated close to the red focus and the second shield is situated close to the blue focus.

14. Headlight according to claim 1, wherein, for a beam with cut-off of the "European dipped beam" type, the top edge of each shield comprises two horizontal segments offset in height connected by an inclined segment.

15. Headlight according to claim 1, having a dipped/main beam dual function, wherein the first and second shields are retractably mounted so as to be selectively moved between a first position for generating a dipped beam and a second position for generating a main-beam.

16. Headlight according to claim 1, wherein the light source is a xenon lamp.

17. Shield assembly for a headlight according to claim 1, comprising first and second shields coupled together and substantially parallel, offset with respect to each other in a direction orthogonal to their large dimension.

18. The shield assembly according to claim 17, wherein the first and second shields comprise a single metallic piece cropped, pressed and bent substantially in a V or U shape, the two arms of the V or U corresponding to the two shields.

19. The shield assembly according to claim 17, wherein one of the shields is entirely opaque and the other shield comprises an opaque transverse strip and an area transparent to light rays situated below this strip.

20. Headlight for a motor vehicle having an optical axis, intended to produce a light beam with a cut-off in the top region of the beam, comprising:

(a) a reflector, notably of the ellipsoidal type, having a first focus and a second focus disposed on the optical axis;

(b) a light source placed substantially at the first focus of the reflector;

(c) a convergent optical means having an object focus situated close to the second focus of the reflector;

(d) a first shield situated in the vicinity of the second focus of the reflector and oriented substantially transversely to the optical axis of the headlight with a substantially horizontal top edge; and (e) a second shield substantially parallel to the first shield but offset along the optical axis in order to be situated closer to the optical means;

wherein the first and second shields create a cut-off in the light beam of the headlight, notably limiting iridescence phenomena, and the second shield comprises an opaque transverse strip and an area transparent to light rays situated below this strip.

21. Headlight according to claim 20, wherein the second shield and the first shield comprise an assembly in a single piece.

* * * * *